(12) United States Patent
Figg et al.

(10) Patent No.: US 11,282,175 B2
(45) Date of Patent: Mar. 22, 2022

(54) SAMPLE IMAGING AND IMAGE DEBLURRING

(71) Applicant: Solentim Ltd, Wimborne (GB)

(72) Inventors: Aaron Figg, Wimborne (GB); Yonggang Jiang, Wimborne (GB)

(73) Assignee: Solentim Ltd, Wimborne Dorset (GB)

( * ) Notice: Subject to any disclaimer, the term of this patent is extended or adjusted under 35 U.S.C. 154(b) by 305 days.

(21) Appl. No.: 15/593,143

(22) Filed: May 11, 2017

(65) Prior Publication Data
US 2017/0330310 A1 Nov. 16, 2017

(30) Foreign Application Priority Data

May 13, 2016 (GB) ...................................... 1608423

(51) Int. Cl.
*H04N 5/00* (2011.01)
*G06T 5/00* (2006.01)
*H04N 5/232* (2006.01)

(52) U.S. Cl.
CPC ......... *G06T 5/003* (2013.01); *H04N 5/23229* (2013.01); *G06T 2207/10056* (2013.01); *G06T 2207/20201* (2013.01)

(58) Field of Classification Search
CPC .......... G06K 9/36; G06K 9/40; H04N 5/2258; H04N 5/23254; H04N 5/23267; G06T 5/003; G06T 5/50; G06T 7/215; G06T 7/207; G06T 7/194; G06T 2207/10016; G06T 2207/20016; G06T 2207/20201
See application file for complete search history.

(56) References Cited

U.S. PATENT DOCUMENTS

2005/0047672 A1\* 3/2005 Ben-Ezra ............. H04N 5/2258
382/255
2012/0288157 A1 11/2012 Kishima

FOREIGN PATENT DOCUMENTS

| EP | 2420970 A1 | 2/2012 |
| EP | 3457192 A1 | 3/2019 |
| JP | 2005164707 A | 6/2005 |
| WO | 2005093654 A2 | 10/2005 |
| WO | 2008131438 A2 | 10/2008 |
| WO | 2013183267 A1 | 12/2013 |

(Continued)

OTHER PUBLICATIONS

Examination Report issued in corresponding application No. GB1608423.8 dated Apr. 8, 2019 (3 pages).

(Continued)

*Primary Examiner* — Frank F Huang
(74) *Attorney, Agent, or Firm* — Ferguson Braswell Fraser Kubasta PC

(57) ABSTRACT

There is provided an apparatus with a sample holder to hold a sample to be imaged. An image capture device has a field of view and captures an image of the field of view. Also provided is an actuator. A controller controls the actuator to cause relative movement between the sample holder and the image capture device at a given speed and at a given direction during an exposure time of the image capture device such that, in use, the sample moves across at least a portion of the field of view during the exposure time. A processor performs a deblur algorithm to deblur the image using the given speed and the given direction.

10 Claims, 7 Drawing Sheets

(56) References Cited

FOREIGN PATENT DOCUMENTS

WO      2015060181 A1     4/2015
WO      2017195442 A1     11/2017

OTHER PUBLICATIONS

Combined Search and Examination Report issued in the corresponding United Kingdom Application No. 1608423.8 dated Nov. 21, 2016 (5 pages).
Examination Report issued in corresponding United Kingdom application No. GB1608423.8 dated Sep. 10, 2019 (2 pages).

\* cited by examiner

SAMPLE IMAGING AND IMAGE DEBLURRING

CROSS-REFERENCE TO RELATED APPLICATIONS

This application claims priority under 35 U.S.C. § 119(a) to GB Application No. 1608423.8, which filed on May 13, 2016. Accordingly, GB Application No. 1608423.8 is hereby incorporated by reference in its entirety.

FIELD

The present technique relates to imaging. For example, the present technique has relevance to the field of sample imaging and deblurring of images.

BACKGROUND

In, for example, digital microscopes, it is often desirable to capture an image of a sample. If there is relative movement between the image capture device and the sample (e.g. if the camera is moved relative to the sample) during exposure, then it is likely that the source in the captured image will have a motion blur, which can make it difficult if not impossible to perform analysis. However, the process of moving the camera, stopping movement of the camera, and then taking an image can be time consuming. This problem is exacerbated when multiple images must be taken; for example, if the camera must be moved multiple times to capture images of multiple samples. It has previously been proposed to reduce motion blur by increasing the light sensitivity of the camera. However, increasing the light sensitivity increases the amount of visual "noise" in the image. Again, this can make it difficult to perform analysis on the resulting image. It is desirable to improve the speed at which such imaging processes can be performed while still making it possible to perform analysis on the resulting images.

SUMMARY

Viewed from a first example configuration, there is provided an apparatus comprising: a sample holder to hold a sample to be imaged; an image capture device having a field of view, to capture an image of the field of view; an actuator; a controller to control the actuator to cause relative movement between the sample holder and the image capture device at a given speed and at a given direction during an exposure time of the image capture device such that, in use, the sample moves across at least a portion of the field of view during the exposure time; and a processor to perform a deblur algorithm to deblur the image using the given speed and the given direction.

Viewed from a second example configuration, there is provided an image processing method comprising the steps: holding a sample to be imaged; capturing an image of a field of view; causing relative movement between the sample and an image capture device at a given speed and a given direction such that the sample moves across a portion of the field of view; and performing a deblur algorithm to deblur the image using the given speed and the given direction, wherein an exposure time of the image capture device when capturing the image corresponds with a time taken for the sample to move across the portion of the field of view.

Viewed from a third example configuration, there is provided an image processing apparatus comprising: means for holding a sample to be imaged; means for capturing an image of a field of view; means for actuating; means for controlling the means for actuating to cause relative movement between the means for holding the sample to be imaged and the means for capturing during an exposure time of the means for capturing such that, in use, the sample moves across at least a portion of the field of view during the exposure time, wherein the relative movement is at a given speed and a given direction; and means for performing a deblur algorithm to deblur the image using the given speed and the given direction.

Viewed from a fourth example configuration, there is provided an image processing method comprising: receiving an input image on which deblurring is to be performed, wherein the input image comprises a plurality of rows of pixels; receiving a given speed and given direction; performing a deblurring operation on the image by performing a plurality of independent row processing operations using the given speed and the given direction, each corresponding to a given row of the plurality of rows, wherein at least some of the row processing operations are performed in parallel.

Viewed from a fifth example configuration, there is provided an apparatus comprising: a sample holder to hold a sample to be imaged; an image capture device having a field of view, to capture an image of the field of view as a plurality of rows of pixels; an actuator; a controller to control the actuator to cause relative movement between the sample holder and the image capture device at a given speed and at a given direction during an exposure time of the image capture device such that, in use, the sample moves across at least a portion of the field of view during the exposure time, wherein an axis of the rows of pixels is aligned with the given direction.

BRIEF DESCRIPTION OF DRAWINGS

The present technique will be described further, by way of example only, with reference to embodiments thereof as illustrated in the accompanying drawings, in which.

DETAILED DESCRIPTION

Figure 1:
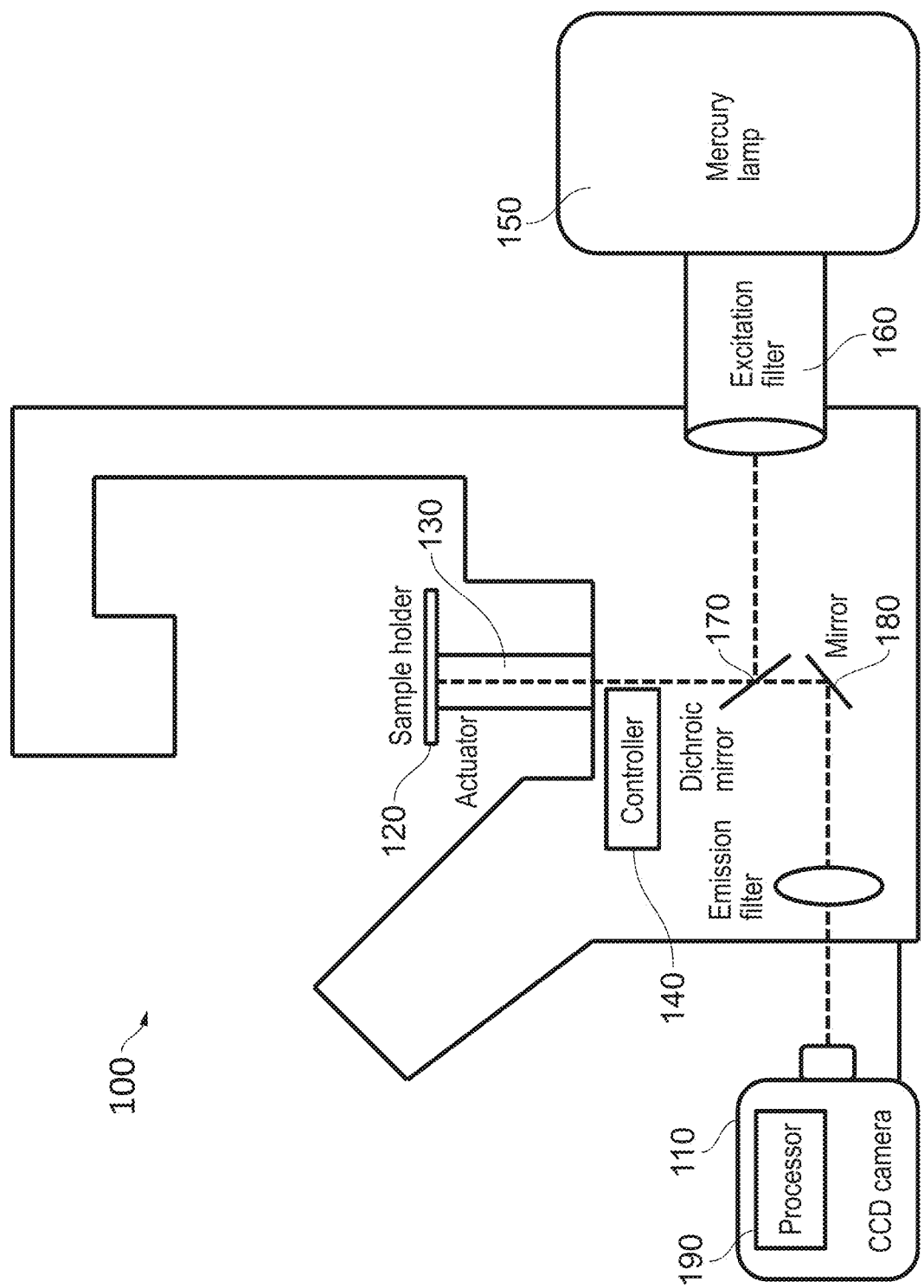
FIG. 1 illustrates an apparatus in accordance with some embodiments.

Before discussing the embodiments with reference to the accompanying figures, the following description of embodiments and associated advantages is provided.

In accordance with one example configuration there is provided an apparatus comprising: a sample holder to hold a sample to be imaged; an image capture device having a field of view, to capture an image of the field of view; an actuator; a controller to control the actuator to cause relative movement between the sample holder and the image capture device at a given speed and at a given direction during an exposure time of the image capture device such that, in use, the sample moves across at least a portion of the field of view during the exposure time; and a processor to perform a deblur algorithm to deblur the image using the given speed and the given direction.

By causing relative movement between the sample and the image capture device (i.e. by either moving the camera relative to the sample or the sample relative to the image capture device) while the image is being exposed, a blurred image (e.g. of the sample) is intentionally created. However, since the relative movement occurs at a given direction and a given speed, which is either known or can be determined, a deblur algorithm can be applied to undo much if not all of the blurring. Consequently, the camera can keep moving and so the imaging process can be completed more quickly than if the camera must start and stop.

In some embodiments, the given speed of the relative movement between the sample and the image capture device is substantially constant. In these embodiments, the speed of the relative movement may differ, for example, by an extent caused by defects in the manufacturing process of parts of the apparatus.

In some embodiments, the relative movement between the sample and the image capture device occurs substantially only in the given direction. In these embodiments, the direction of the relative movement may differ, for example, by an extent caused by defects in the manufacturing process of parts of the apparatus.

In some embodiments, the apparatus further comprises speed determining circuitry to determine the given speed. In such embodiments, the exact speed at which the relative movement occurs could be initially unknown. However, by using the speed determining circuitry in these embodiments, it is possible to determine the speed at which the relative movement occurs.

In some embodiments, the apparatus further comprises direction determining circuitry to determine the given direction. In such embodiments, the exact direction in which the relative movement occurs could be initially unknown. However, by using the direction determining circuitry in these embodiments, it is possible to determine the direction at which the relative movement occurs.

In some embodiments, the image capture device is to capture a plurality of images of a plurality of fields of view of the image capture device; and the actuator is further to cause relative movement between the sample and the image capture device between each of the plurality of images such that the image capture device obtains the plurality of fields of view. In these embodiments, as a consequence of relative movement between the sample and the image capture device between successive images, the field of view of the image capture device will change. Accordingly, a plurality of fields of view will be imaged. As the number of images that are taken increase, a further improvement in processing time may be experienced by virtue of the camera being required to start and stop less often.

In some embodiments, the sample holder holds a plurality of samples to be imaged; and the plurality of images comprises at least one image of each of the plurality of samples. In such embodiments, the sample holder could be a well plate, for example, with each well in the well plate holding a different sample to be imaged.

In some embodiments, two consecutive images in the plurality of images overlap by an amount greater than a product of the exposure time of the image capture device and the given speed. The exposure time of the image capture device multiplied by the given speed can be used to determine a "streak length", e.g. the length of a streak caused by an object moving across the portion of the field of view while exposure occurs. Since the overlap is greater than the maximum streak length, there will be a single image showing the streak in its entirety. Since no information will be "lost" as a consequence of the streak disappearing off the end of an image, the deblur algorithm can be applied to remove the blur in an effective manner. In other embodiments, the streak length is longer than the overlap and so image data can be "lost". Note that in some embodiments, all pairs of consecutive images overlap by an amount greater than the product of the exposure time of the image capture device and the given speed. In those embodiments, there is at least one image of every streak in its entirety.

In some embodiments, two consecutive images in the plurality of images overlap by an amount less than 120% of a product of the exposure time of the image capture device and the given speed. Generally it is desirable to have long streaks, since this provides more data with which to perform the deblur algorithm and so can result in more accurate deblurred images. However, the overlap must be at least as large as the maximum streak length and if the overlap is too extensive then an efficiency of the apparatus is reduced since a large number of images will be unnecessarily produced. Consequently, the amount of deblur processing that occurs will be increased and so the time taken to produce the deblurred images will be longer than if a smaller number of images are produced having less overlap.

In some embodiments, two consecutive images in the plurality of images overlap by 50%. An overlap of 50% represents a good tradeoff between the desire to create longer streaks for accurate deblur processing, the need to have an overlap at least as large as the streak length to avoid losing information, and the desire to have an efficient processing time for processing the deblur algorithm.

In some embodiments, the deblur algorithm is iterative. In other words, a block of instructions are executed repeatedly. For example, the iterative algorithm might be recursive such that the solution to one or more sub-problems are used to solve the overall problem. In some embodiments, the output from one iteration is provided as an input to the next or a future iteration.

In some embodiments, the image comprises a plurality of rows of pixels; an axis of the rows of pixels is aligned with the given direction; and the deblur algorithm comprises a plurality of independent row processing operations each corresponding to a given row of the plurality of rows of pixels. Since the cause of the blurring is as a consequence of the relative movement between the sample and the image capture device occurring in a given direction, and since the rows of pixels are aligned with the given direction, blurring that occurs in respect of one row of pixels is independent from the blurring that occurs in an adjacent row of pixels. Consequently, the deblur algorithm can occur as a plurality of row processing operations that occur independently, and each correspond with one of the rows in the plurality of rows of pixels.

In some embodiments, at least some of the row processing operations are performed in parallel. Given that the row processing operations are independent, the row processing operation performed in respect of one row does not affect the row processing operation in respect of another row. The processing of the rows can therefore be parallelised in order to complete processing of the image in a faster time.

In some embodiments, the deblur algorithm is iterative; and at each iteration, an evaluation value for a row of pixels is determined; and based on the evaluation value for the row of pixels in one iteration and the evaluation value for the row of pixels in a next iteration, the deblur algorithm is to disregard that row of pixels in subsequent iterations. The evaluation value for a row of pixels between two iterations can be used to determine whether the row processing operation for that row has completed or not.

For example, in some iterations, based on a difference between the evaluation value for the row of pixels in one iteration and the evaluation value for the row of pixels in the next iteration, the deblur algorithm is to ignore that row of pixels in subsequent iterations. For example, if the evaluation value difference between two consecutive iterations changes by less than some threshold amount then it may be determined that additional iterations are unlikely to have further improvements on the deblurring of the image. The evaluation value could be an array of values representing a score for each pixel in the row. The difference could then represent a maximum difference between two corresponding pixels in two iterations of the deblur algorithm. In this way, the algorithm would continue until there was no pixel that changed more than some threshold value.

In some embodiments, the deblur algorithm is based on a Lucy-Richardson deconvolution process.

In some embodiments, the image capture device performs fluorescence imaging. Fluorescence imaging relates to a process in which a sample is illuminated with light of a particular wavelength. Once exposed, the sample then continues to fluoresce by emitting light of a second wavelength for a short period. This emitted light can be detected.

In some embodiments, the image capture device is a grayscale image capture device. Performing deblurring can be performed more effectively when a grayscale image is provided, since it may only be necessary to consider the intensity of each pixel, rather than its colour value.

In some embodiments, the apparatus is a digital microscope.

Note that throughout this description, the term "row" is used to refer to an array of pixels. For the avoidance of doubt, the term "row" includes "column", which is also an array of pixels.

Particular embodiments will now be described with reference to the figures.

FIG. 1 shows an apparatus 100 in accordance with some embodiments. In Figure, the apparatus 100 is a digital microscope. The digital microscope 100 includes a Charged Coupled Device (CCD) camera 110 (an example of an image capture device), which photographs a sample held by a sample holder 120. The sample holder could be a well plate for holding a plurality of samples, each one of which is to be imaged using the CCD camera 110. An actuator 130 is able to move the sample holder 120, thereby providing relative movement between the CCD camera 110 and the sample holder 120. The relative movement is in a given direction and occurs at a given speed. In the current embodiment, both the given direction and the given speed are known and need not be detected. In respect of motion, for example, the system of the present embodiment is constrained in terms of its motion. However, in other embodiments, further circuitry provides this information, possibly by detecting the actual achieved speed and direction while the relative movement occurs. Furthermore, in this embodiment, the given speed is substantially constant and the given direction is substantially the only direction in which the relative movement occurs. Other movement can occur from this as a consequence of manufacturing defects in, for example, the actuator. Of course, in other embodiments, the CCD camera 110 could be moved in order to create the relative movement. A controller 140 is used to cause the relative movement to take place during an exposure time of the CCD camera 110. In other words, while an image is being exposed (the shutter of the CCD camera 110 is open, causing a light sensor to be exposed to incoming light), relative movement by the actuator 130 occurs. This causes the image captured by the CCD camera 110 to be blurred. The imaging technique used in the embodiment shown in FIG. 1 is fluorescence imaging. A mercury lamp 150 and excitation filter 160 are used to produce a light corresponding to a particular wavelength. This light is reflected by dichroic mirror 170 towards the sample held by the sample holder 120. As a consequence of the illumination, the sample in the sample holder emits a light of a different wavelength. The dichroic mirror is designed to not reflect light of this wavelength, as opposed to light of the wavelength produced by the mercury lamp 150 and excitation filter 160. The light therefore passes through dichroic mirror 170 and is instead reflected by mirror 180. The light passes through an emission filter before being received by the CCD camera 110. Since the given direction and given speed are known, these are provided to a processor 190 of the CCD camera, which then performs deblurring on the received image. Suitable processes, such as Lucy-Richardson deconvolution, will be known to the skilled person.

Note that in other embodiments, the processor 190 may be entirely separate from the rest of the apparatus. In such embodiments, blurred images are produced by the CCD camera. The images could then be deblurred at a later time or date. For example, the images could be outsourced for the deblurring algorithm to be performed. It will also be appreciated that although this embodiment uses a CCD as an image capture device, other image capture technology (such as CMOS) can also be used.

Figure 2:
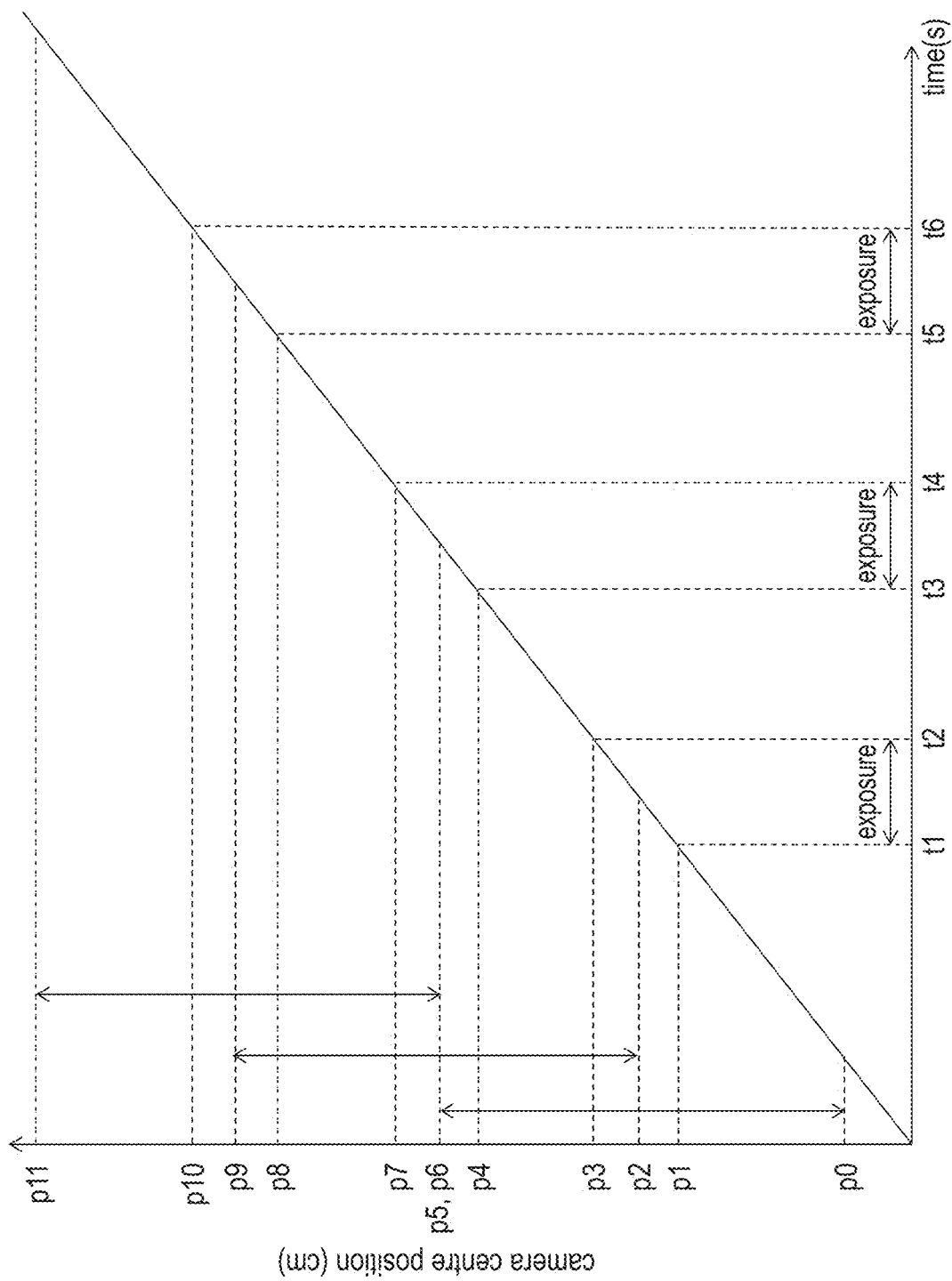
FIG. 2 shows an example of relative movement between the image capture device and sample in accordance with some embodiments.

FIG. 2 shows an example of relative movement between the image capture device and sample in accordance with some embodiments. In FIG. 2, it is assumed that the sample holder 120 moves at a constant speed relative to the camera. This constant speed is maintained whether the camera is being exposed or not. Three different exposure times are shown, lasting from t1 to t2, t3 to t4, and t5 to t6. In this embodiment, each of the exposure times are substantially constant and are larger than the non-exposure times. While at time t1 the centre of the camera is pointed at position p1, at time t2 the centre of the camera is pointed at position p3, at time t3 the centre of the camera is pointed at position p4, at time t4 the centre of the camera is pointed at position p7, at time t5 the centre of the camera is pointed at position p8, and at time t6 the centre of the camera is pointed at position p10. These positions represent only the centre position of the camera. They do not represent the full field of view of the camera, which depends on the optical configuration of the camera. In the example of FIG. 2, the field of view can be considered to be twice the distance between p1 and p0. Accordingly, the overall area swept by the three exposures is from p0 to p5, p2 to p9, and p6 to p11 respectively. These areas are shown by the three sets of arrows in FIG. 2. The arrows overlap by 50% in the case of FIG. 2. Consequently, the images that are produced at the three exposure times will overlap by 50%.

Figure 3:
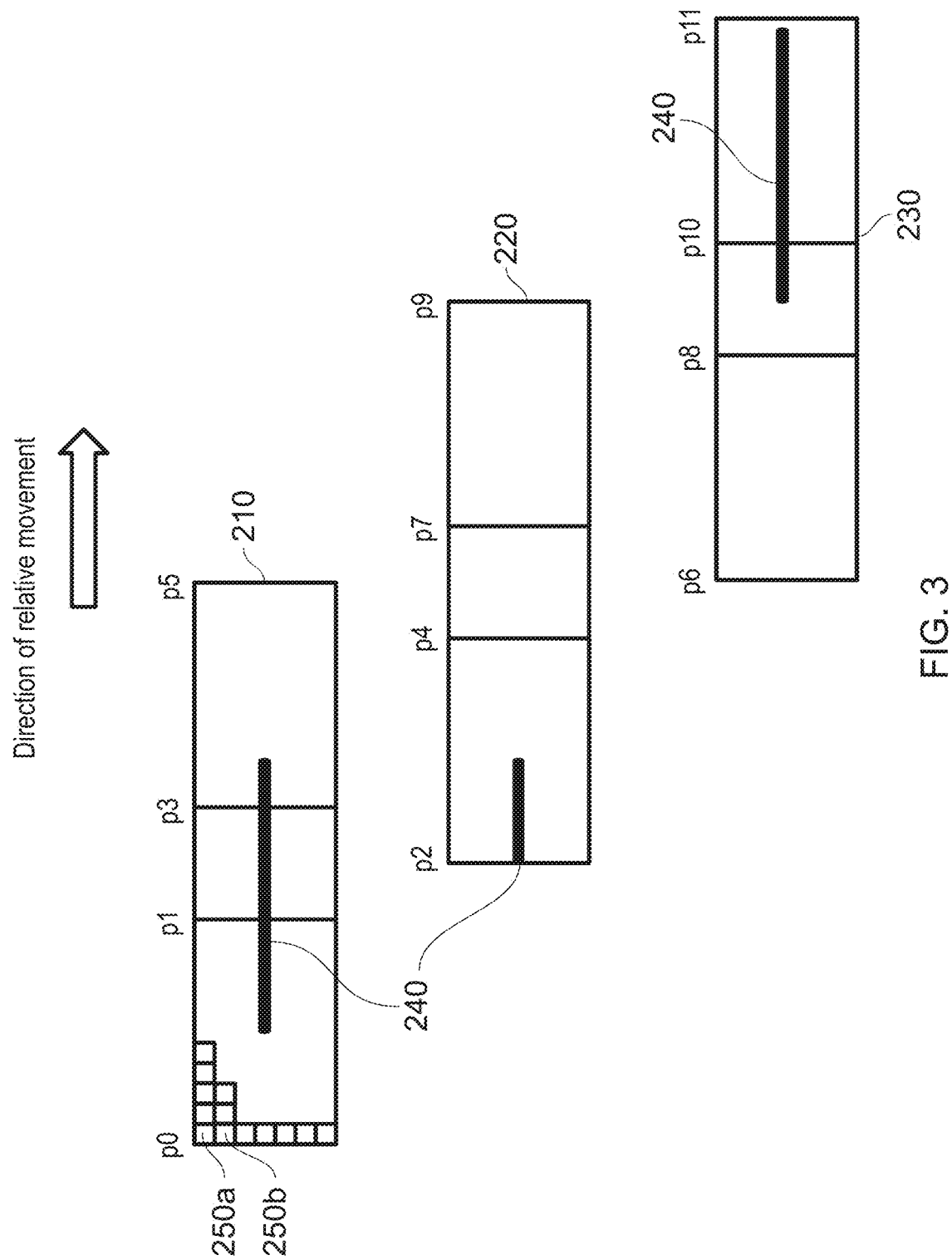
FIG. 3 shows an example of a plurality of images produced as a consequence of the relative movement in some embodiments.

FIG. 3 shows an example of a plurality of images 210, 220, 230 produced as a consequence of the relative movement in some embodiments. The plurality of images 210, 220, 230 correspond with the three exposure times shown in FIG. 2 and the images 210, 220, 230 have been arranged to illustrate the overlap between the images. For example, an overlap between the first two images 210, 220 exists between point p2 and point p5. Furthermore, an overlap between the second and third images 220, 230 exists between point p6 and p9. In each of the plurality of images 210, 220, 230 in FIG. 3, a streak 240 is shown. Note that in some embodiments, each sample in the sample holder will be imaged and so there will be at least one image of each sample. It will be appreciated by the skilled person that the streak is caused by the sample (which in these embodiments is treated as a sphere of light), which blurs as a consequence of the relative movement during exposure. The length of the streak is the product of the exposure time of the image and the speed of the relative movement between the CCD camera and sample holder (measured as the number of pixels in a row captured by the camera per second). In these embodiments, the overlap is arranged to be less than the maximum streak length. Consequently, all of a streak will appear on a single one of the images 210, 220, 230. Each of the images comprises a plurality of rows of pixels 250a, 250b, partially illustrated in FIG. 3. The axis of the rows of pixels is aligned with the given direction, i.e. the direction of relative movement. In this example, for instance, the rows run left to right and the direction of movement occurs from left to right. In another example, the rows and the relative movement might be from top to bottom. Consequently, the blurring that occurs in each row is independent.

It is worth noting that typically it is desirable to have a large overlap, since this enables a longer streak length. A longer streak length means that more data is collected and this can therefore improve the ability to perform deblurring. However, it is undesirable for the same streak to appear (in its entirety) in multiple images, since this would cause a replication in work. In other words, the same streak would be deblurred multiple times. In some embodiments, therefore, the overlap is limited to being less than 120% of the maximum streak length, since this produces a high overlap while reducing the probability that numerous images will include the same streak. In some embodiments, the overlap is exactly equal to the maximum streak length at 50% of the image. This allows for the maximum streak length to appear on a single image without the streak fully appearing on multiple images. In some embodiments, the range of permissible overlap is 45% to 50% to allow for unexpected deviations in streak length.

Figure 4:
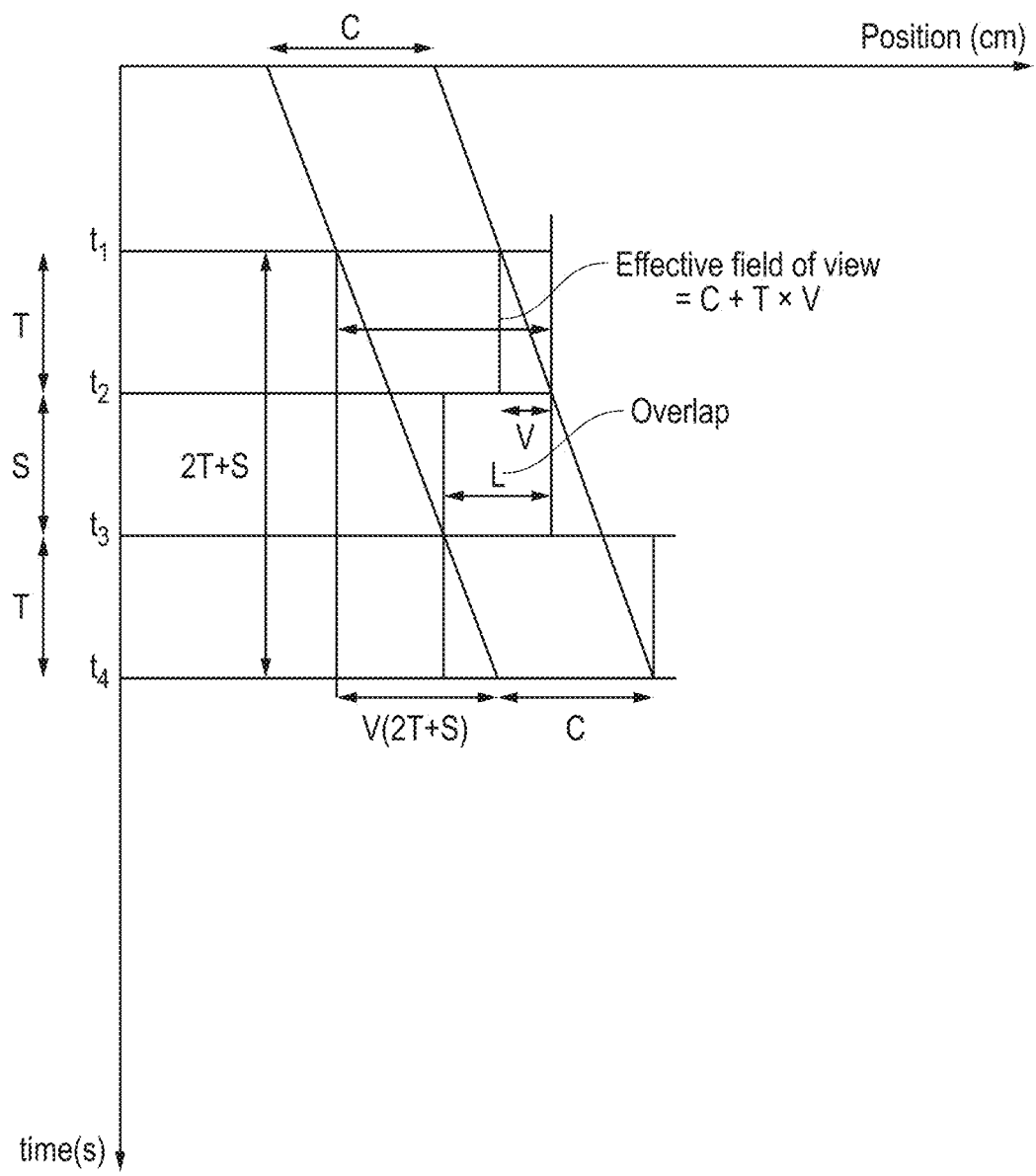
FIG. 4 illustrates a relationship in overlap between consecutive images in the plurality of images in accordance with some embodiments.

FIG. 4 illustrates a relationship in overlap between consecutive images in the plurality of images in accordance with some embodiments. In FIG. 4, two different exposure times are shown. The first occurs from t1 to t2 and the second occurs from t3 to t4. Each exposure lasts for a period of T seconds. In addition, a period of S seconds elapses between the first exposure time and the second exposure time. The field of view of the image capture device is defined as C. As shown in FIG. 4, due to the relative movement between the image capture device and the sample holder at speed V, an area is "swept" by the field of view. The effective field of view is therefore equal to C+TV. As shown in FIG. 4, an overlap between two consecutive images is shown as L. Using this information, it is possible to determine a relationship for S, the time between consecutive exposures.

The overall area covered by two consecutive exposures is equal to the effective field of view of two exposures minus the overlapped area, i.e. 2(C+TV)−L. Similarly, however, this area is also equal to the area swept by the field of view over the entire time period, i.e. C+V(2T+S). Accordingly:

$$2(C+TV)-L=C+V(2T+S) \quad \text{(Equation 1)}$$

$$C-VS=L \quad \text{(Equation 2)}$$

As previously noted, in order for the streak to fit on a single image, the maximum size must be less than the overlap. In other words:

$$L \geq TV \quad \text{(Equation 3)}$$

Inserting Equation 2 into Equation 1 gives:

$$C-VS \geq TV \quad \text{(Equation 4)}$$

Therefore:

$$S \leq C/V - T \quad \text{(Equation 5)}$$

Consequently, it can be said that as the stationary field of view (C) increases, the time between successive images can increase. As the relative speed between the image capture device and the sample holder increases, the time between successive images reduces. Additionally, as the exposure time increases, the time between successive images increases.

Figure 5:
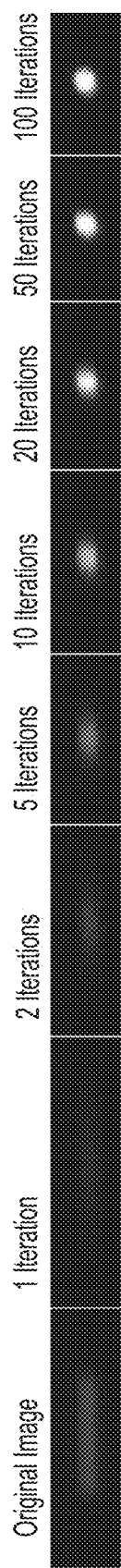
FIG. 5 shows the effect of performing multiple iterations of a deblur algorithm on an image in accordance with some embodiments.

FIG. 5 shows the effect of performing multiple iterations of a deblur algorithm on an image in accordance with some embodiments. Having obtained blurred images 210, 220, 230 as shown, for example in FIG. 3, a deblur algorithm is performed in order to obtain a deblurred image. The deblurred image should approximately correspond with the image that would be produced if the relative movement between the CCD camera and sample holder was stopped during exposure. In many embodiments, the CCD camera is grayscale, movement occurs in a single direction at a known speed (and so the distance moved can be determined), and since the image comprises a small point of light in an otherwise dark image, and such factors improve the effectiveness of applying a deblur algorithm. These factors make it possible to reasonably define a process that indicates how to get from a source image to a blurred image. This process can then be reversed to convert the blurred image into a clean source image. More specifically, for every point on the source image it can be defined which points on the blurred image contain light from the source point, and in what proportions. Thus every point on the blurred image contains the sum of all of the light from all of the source points that contributed to it. The deconvolution process is designed to take an initial "guess" at what the original image looked like, and use the blurred image to improve the guess. This process is applied repeatedly to the "guess", continually making it better. Research behind the Lucy-Richardson deconvolution indicates that the output is the most likely source image that produced the blurred image that we captured. Such a process also deals well with the sort of noise seen in CCD device sensors. In FIG. 5, it can be seen that as the number of iterations of the algorithm increases from 0, to 1, to 2, to 5, to 10, to 20, to 50, to 100, the quality of the deblurred image improves with diminishing returns. Indeed, in the example shown in FIG. 5, little improvement between 50 iterations and 100 iterations can be seen as compared between 0 iterations and 50 iterations.

Figure 6:
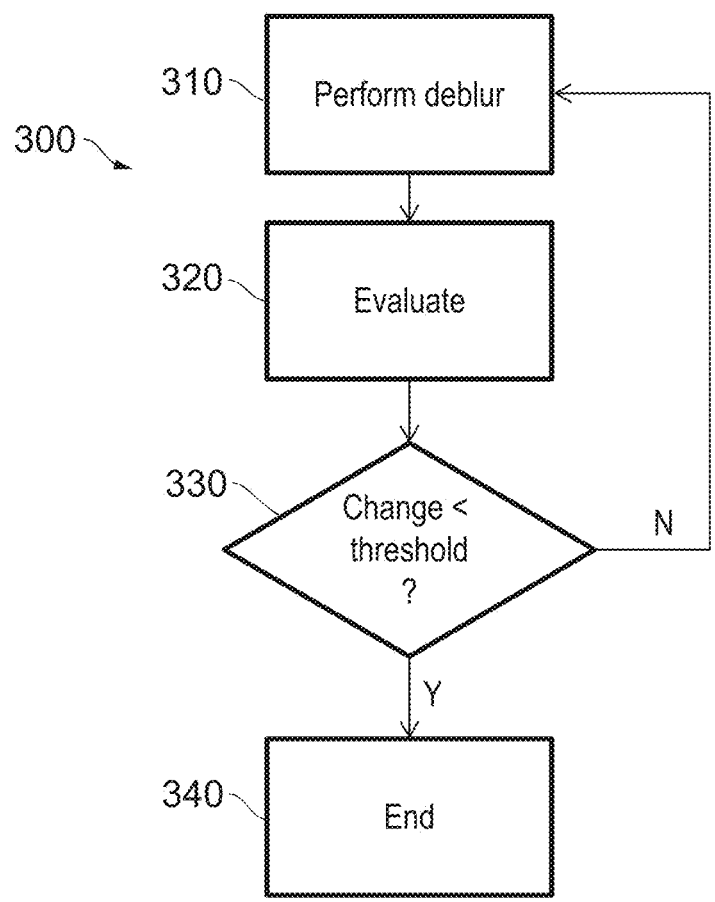
FIG. 6 is a flow chart illustrating a method of image processing in accordance with one embodiment.

FIG. 6 is a flow chart 300 illustrating a method of image processing in accordance with one embodiment. The flowchart corresponds with a processing operation that runs on a single row (a row processing operation that is part of the overall deblur algorithm). Given that the axis of the rows of pixels is aligned with the given direction, the blurring that occurs in one row is independent of the blurring that occurs in another row. Each row can therefore be processed independently of the others and so at least some of the rows can be processed in parallel to each other. The row processing operation can begin, for example, at step 310 where deblurring is performed on the current row. The deblurring makes use of the fact that the given direction and given speed are known. At step 320, an evaluation process is performed on the row. The evaluation process is used to determine the extent of change that is effected by the deblurring. For example, the evaluation process might involve determining an intensity of each pixel in the row. At step 330, it is determined whether the change in evaluations is below some threshold. In some embodiments, this determination is made by considering the maximum difference in pixel intensity between corresponding pixels before and after the deblurring is performed. If the change is less than some threshold value then the row processing operation ends at step 340. Otherwise, the process repeats for that row by returning to step 310. The overall operation is therefore looped in that the deblurring continually occurs until such time as its overall effect falls below the threshold value, the evaluation of the overall effect being calculated by considering the maximum change in pixel intensity value for corresponding pixels.

Figure 7:
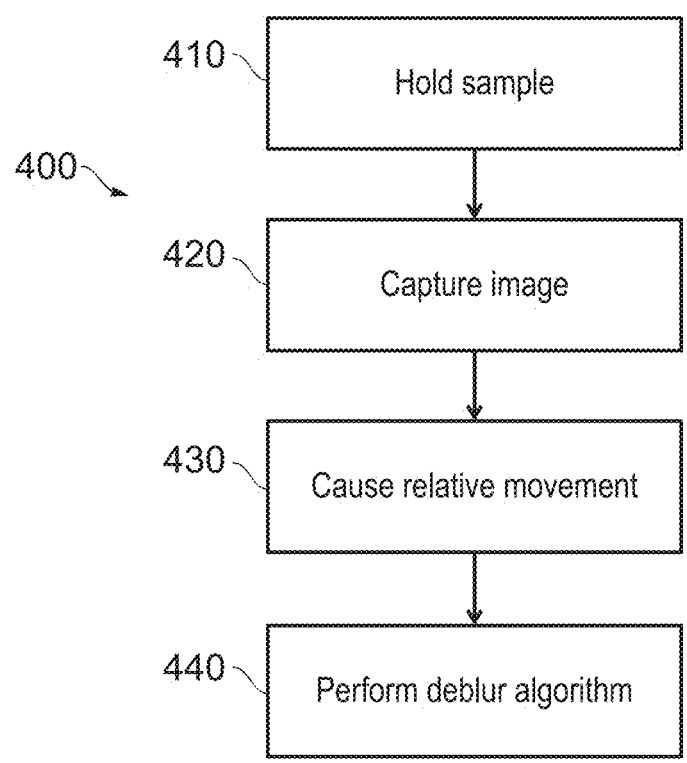
FIG. 7 is a flow chart illustrating a method of image processing in accordance with one embodiment.

FIG. 7 is a flow chart 400 illustrating a method of image processing in accordance with one embodiment. The process can begin, for example, at step 410 in which a sample is held by a sample holder 120. At step 420, image capture of the sample begins by an image capture device such as a CCD camera 110. During exposure of the image, at a step 430, relative movement between the sample and the image capture device 110 occurs at a given speed and in a given direction. This causes a streak 240 to occur in the corresponding image. At a step 440, a deblur algorithm is then applied in order to produce a deblurred image. The deblur algorithm can take advantage of the fact that that the given speed and the given direction are both known and so deblurring can occur effectively. The process can be repeated for multiple images that are taken. Alternatively, steps 410-430 could be repeated for a plurality of images and step 440 could be performed at the end once the images have been produced.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

What is claimed is:

1. An apparatus, comprising:
  a sample holder to hold a sample to be imaged;
  an image capture device having a field of view, to capture an image of the field of view,
  wherein the image capture device is configured to capture a plurality of images;
  an actuator, wherein the actuator is further configured to cause relative movement between the sample and the image capture device, and wherein the relative movement causes the plurality of images to become a plurality of blurred images;
  a controller to control the actuator to cause relative movement between the sample holder and the image capture device at a given speed and at a given direction during an exposure time of the image capture device such that, in use, the sample moves across at least a portion of the field of view during the exposure time,
    wherein the given speed of the relative movement between the sample and the image capture device is substantially constant,
    wherein the relative movement between the sample and the image capture device occurs substantially only in the given direction; and
  a processor to perform a deblur algorithm to deblur the image using the given speed and the given direction, wherein the deblur algorithm comprises a deconvolutional process that takes an initial guess at an original image for the plurality of blurred images and use the plurality of blurred images to improve the initial guess to form a deblurred image.

2. The apparatus according to claim 1, further comprising: speed determining circuitry to determine the given speed.

3. The apparatus according to claim 1, wherein:
  the sample holder holds a plurality of samples to be imaged; and
  the plurality of images comprises at least one image of each of the plurality of samples.

4. The apparatus according to claim 1, wherein the deblur algorithm is iterative.

5. The apparatus according to claim 1, wherein the deblur algorithm is based on a Lucy-Richardson deconvolution process.

6. The apparatus according to claim 1, wherein the image capture device performs fluorescence imaging.

7. The apparatus according to claim 1, wherein the image capture device is a grayscale image capture device.

8. The apparatus according to claim 1, wherein the apparatus is a digital microscope.

9. An image processing method, comprising:
  holding a sample to be imaged;
  causing relative movement between the sample and an image capture device at a given speed and a given direction such that the sample moves across a portion of the field of view;
  capturing an image of the sample during the relative movement, wherein capturing during the relative motion forms a blurred image of the sample; and
  performing a deblur algorithm to deblur the image using the given speed and the given direction,
    wherein an exposure time of the image capture device when capturing the image corresponds with a time taken for the sample to move across the portion of the field of view, and
    the deblur algorithm comprises a deconvolutional process that takes an initial guess at an original image for the blurred image and use the blurred image to improve the initial guess to form a deblurred image.

10. An image processing apparatus, comprising:
  means for holding a sample to be imaged;

means for capturing an image of a field of view, wherein the means for capturing is configured to capture a plurality of images;

means for actuating, wherein the means for actuating is further configured to cause relative movement between the sample and the means for capturing, and wherein the relative movement causes the plurality of images to become a plurality of blurred image;

means for controlling the means for actuating to cause relative movement at a given speed in a given direction between the means for holding the sample to be imaged and the means for capturing during an exposure time of the means for capturing such that, in use, the sample moves across at least a portion of the field of view during the exposure time, wherein the given speed of the relative movement between the sample and the image capture device is substantially constant, wherein the relative movement between the sample and the image capture device occurs substantially only in the given direction; and means for performing a deblur algorithm to deblur the image using the given speed and the given direction, wherein the deblur algorithm comprises a deconvolutional process that takes an initial guess at an original image for the plurality of blurred images and use the plurality of blurred images to improve the initial guess to form a deblurred image.

* * * * *